Jan. 4, 1944.  E. WITTKOP  2,338,476
CENTRIFUGAL COUPLING
Filed Oct. 25, 1940
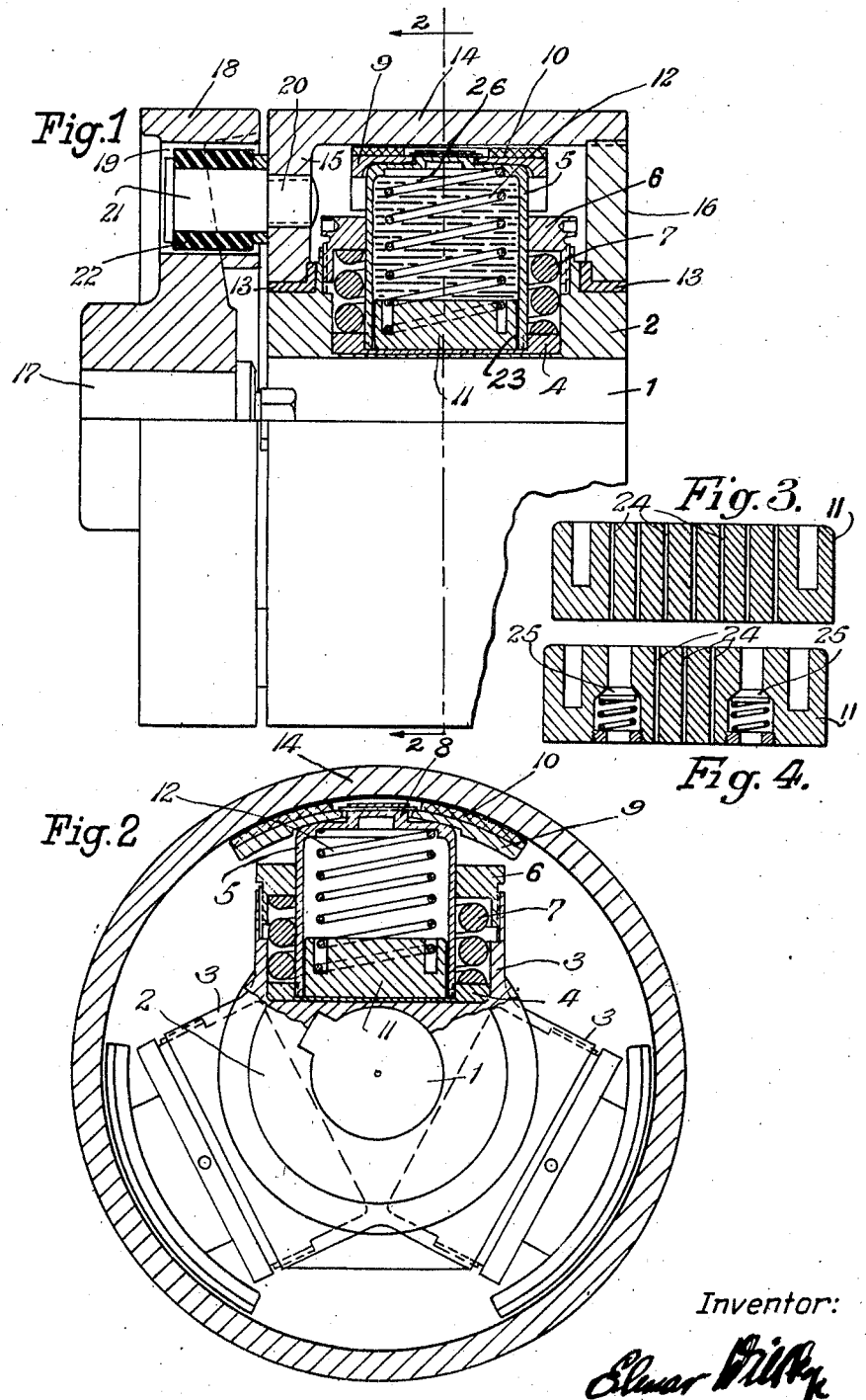
Inventor:
Elmar Wittkop Patented Jan. 4, 1944

2,338,476

UNITED STATES PATENT OFFICE 2,338,476

CENTRIFUGAL COUPLING

Elmar Wittkop, Sprockhovel, Germany; vested in the Alien Property Custodian

Application October 25, 1940, Serial No. 362,883
In Germany December 27, 1938

5 Claims. (Cl. 192—105)

My present invention relates to clutch devices and more particularly to an improved centrifugally operated clutch of the automatic type.

My invention is adapted particularly to be interposed between a driving and a driven member and wherein the driving member is automatically connected, in the driving sense, to the driven member when the driving member has attained a predetermined rate of speed.

In carrying out my invention I utilize in connection with the driving member and mounted thereon a member having a plurality of radially extending cavities therein and at each of which cavities is slidably mounted a hollow cylinder filled with a damping fluid, such as oil, and in which cylinder also is slidably mounted a piston provided with means for permitting the damping fluid to pass from one side to the other thereof during the operation of the device. In addition the hollow cylinders carried by the driving member as well as the pistons mounted thereon are subject to the action of springs during the operation of the device.

With my present invention, the arrangement of the various parts is such that the radially moving hollow cylinders and pistons having relatively long range of movement as well as being of relatively large diameter, with the result that the device is sensitive in operation and is capable of transmitting great turning moments in spite of the small driving bulk.

The use of springs which act counter to the centrifugal force generated by the rotating element makes it possible to exert an influence upon the course of the coupling operation by properly adjusting the tension of such springs.

Carried by the hollow cylinders are loosely mounted friction elements which engage with the internal surface of the driven member and couple the driving and driven member together. The coupling of the driving and driven members together takes place gradually and without appreciable shock. As the driving member picks up speed the hollow cylinders carrying friction elements gradually move radially outward into engagement with the internal surface of the driven member. There is slippage between the driving and driven members until the driving member attains practically its full speed, at which time the coupling operation is complete and the driving and driven members rotate as a unit.

The object of my invention therefore is an improved centrifugal coupling or clutch.

In the accompanying drawing:

Fig. 1 is a side elevation partly in section of a centrifugal coupling designed according to the present invention.

Fig. 2 is a front view partly in section of the structure shown in Fig. 1 and taken approximately on the line 2—2 of Fig. 1.

Fig. 3 is a sectional elevation of a modified form of piston, and

Fig. 4 is a sectional elevation of a still further modified form of piston.

Referring to the drawing, 1 designates a driving shaft from which power is to be transmitted. Keyed or otherwise secured to the driving shaft 1 is a housing 2. Formed in the housing and concentrically arranged about the axis thereof and extending radially outward therefrom are cylinders 3. In each of the cylinders 3 is slidably mounted a piston 4. Each piston 4 is counterbored and threaded on its inner face and screwed into such counterbored portion is the open outer end of a hollow cylinder 5. The open end of each cylinder 3 is internally threaded to receive an annular member 6, the internal bore of which acts as a bearing in which slides the hollow cylinder 5. In the annular space formed between the outer diameter of each hollow cylinder 5 and the internal bore of its cylinder 3 is a coil spring 7 which urges the piston 4 and therefore the hollow cylinder 5 radially inward of the driving shaft 1. The outer end of each hollow cylinder 5 is closed and is provided with a projection 8. 9 designates arcuate clutch members. On the outer surfaces of said clutch member 9 is a clutch shoe 10. Said clutch shoe 10 lies adjacent to the inner surface of said circular housing, the center of which is driving shaft 1.

Each hollow cylinder 5 has slidably mounted therein a piston 11. Arranged between the outer end of each piston 11 and the outer end of its hollow cylinder 5 is a coil spring 12 which constantly urges the piston 11 radially inward toward the center of the driving shaft 1.

At each end of the housing 2 is formed a bearing 13. 14 designates a cylinder having formed integral therewith at one end an inwardly extending flange 15. The flange 15 is provided with a cylindrical opening therethrough which is of a diameter to engage with the bearing 13 at one end of the housing 2. The open end of the cylinder 14 is closed by means of an annular flange 16 and this flange 16 rotates on the bearing 13 at the other end of the housing 2. The inner diameter of the cylinder 14 is such as to act as a friction surface in conjunction with the clutch shoes 10 on the arcuate clutch members 9.

In axial alignment to the driving shaft 1 is a driven shaft 17 and to which power is to be transmitted from the driving shaft 1. Secured to the driven shaft 17 by keying or in any other suitable manner is a flange 18. Formed in the flange 18 adjacent the periphery thereof is a cylindrical hole 19. Formed in the flange 15 that is integral with the cylindrical member 14 and in axial alignment with the axis of the hole 19 in the flange 15 is a hole internally threaded to receive a threaded stud 20 formed integral with a stub shaft 21. Mounted on and surrounding the stub shaft 21 is a cylinder 22 of resilient material, such, for example, as rubber.

While the cylindrical members 3 are relatively fixed, the hollow cylinders 5 attached to the pistons 4 and each piston 11 within a cylinder 5 are radially movable independently of one another so that when the driving shaft 1 starts to rotate, such members tend to move radially outward. This tendency is, however, counteracted by several forces, namely, the cylindrical members 3 are continually subjected to the action of coil springs 7, the tension of which may be adjusted by the aid of the annular members 6. The tension given to the cylindrical members 3 is so chosen that such cylinders remain in equilibrium when the machine or engine, of which the driving shaft 1 is a part, is starting.

The cylinders 5 between the closed outer end thereof and the pistons 11 are filled with a damping material 26, such as oil, and which cooperates with the coil springs 12 to damp the radially outward movement of such pistons 11 upon rotation of the driving shaft 1. Each piston 11 may have a relatively loose fit in its cylinder 5 as indicated by the space between the cylinder wall and the outer circumference of the piston 11, as designated by the numeral 23, to allow leakage of the damping medium 26, such as oil, from the outer face of the piston 11 to the inner face thereof as indicated in Fig. 1. If desired, each piston 11 may have a relatively snug fit in its cylinder 5 and may be provided with a plurality of perforations 24 as shown in Fig. 3. In this case, the radially outward movement of the piston 11 will force the damping material 26, such as oil, through the perforations 24 and upon stoppage of rotary movement of the driving shaft 1, the spring 12 associated with such piston 11 will force the piston radially inwardly, thus replacing the damping material from the inner face of the piston 11 to the outer face thereof. In conjunction with the perforations 24, if it is desired to hasten the movement of the damping material 26, such as oil, from the outer face of the piston 11 while retarding the movement of such damping material from the inner face of the piston 11, I may provide one or more one-way valve members 25 which open readily to permit passage of the damping material 26 from the outer face of the piston 11 to the inner face thereof but which act to close upon attempt of the damping material to travel in the reverse direction, thereby confining the return movement of the damping material to passage through the perforations 24.

In operation and assuming the devices to have been constructed as shown in the drawing and as above described, and that the driving shaft 1 is to be coupled to the driven shaft 17, preferably without shock and at a time when the driving shaft 1 has attained its full driving speed, as the driving shaft 1 begins to rotate the pistons 4 and 11 are urged radially outward, but because of the weakness of the springs 12 over the weakness of the springs 7 the pistons 11 tend to move more rapidly radially outward than the pistons 4 carrying the cylinders 5. The tendency of the pistons 11 to move radially outward, is, however, influenced by the damping material 26 which is at this time stationed between the outer end of the closure of the cylinders 5 and the outer face of the pistons 11. As the speed of the driving shaft 1 increases, the pistons 11 will be moved radially outward against the compression of the springs 12 and the damping material 26 will gradually flow in the cylinders 5 to the inner face of the pistons 11, and also the cylinders 5 under the influence of the centrifugal force generated upon the pistons 4 will move outwardly until, by the time the driving shaft 1 has attained its full speed, the clutch shoes 10 will move into engagement with the inner surface of the cylinder 14. This engagement of the clutch shoes 10 with the inner clutching surface of the cylinder 14 will be gradual and there will be slippage between the clutch shoes 10 and the internal surface of the housing 14 and therefore there will be a gradual rotary movement imparted to the driven shaft 17 because of such sliding movement until, when the clutch shoes 10 take full hold and come into full clutching effect, the driven shaft 17 will attain its full measure of rotation. The connection of the driving shaft 1 with the driven shaft 17 will therefore be gradual and the coupling between such shafts will be without shock, and the driven shaft will speed up gradually from zero revolutions to its maximum number of revolutions rather than be thrown into full speed instantly. There are, therefore, no knock-like strains imparted to the mechanism either driving or driven by the present alignment.

Each cylinder 5, the piston 11 contained therein and the fluid 26 in the cylinder act substantially as a unit, the action of which is modified by the coil springs 7 and 12. Under the action of centrifugal force each cylinder 5 is moved radially outward against the tension in the spring 7 which surrounds the cylinder and the piston 11 in the cylinder is also moved radially outward against the tension in the spring 12 within the cylinder. During this outward movement of the cylinder 5 and the piston 11, the fluid 26 within the cylinder fills the space at the inner end of the cylinder now occupied as in Fig. 2 by the piston 11, thereby slowing up the action of the return of the cylinder to its initial position under the influence of the coil spring 12. The clutch member 9 and the clutch shoe 10 are therefore moved gradually outward as the speed of the driving shaft 1 increases so as to bring the clutch shoe 10 gradually into engagement with the inner surface of the cylindrical member 14. There is, therefore, a gradual movement of the working parts into engagement with each other and also on the reverse out of engagement with each other so that the coupling and uncoupling of the driving and driven members takes place gradually and without shock.

I claim:

1. A centrifugal coupling, comprising in combination a rotatable driving element and a rotatable driven element, a plurality of symmetrically arranged cylindrical members extending radially outward from the rotatable driving element, a piston slidable in each of said radially extending cylindrical members, a cylinder carried by each of said pistons and slidable therewith, each cylinder being hollow, clutch members secured to each slidable cylinder, a cylindrical housing member rotatably mounted upon said rotatable driving element and cooperating with the clutch members carried by the slidable cylinders, spring means constraining the movement of said piston, a plurality of other pistons, each slidable cylinder having one of the second named pistons slidable therein, a spring for yieldingly holding each second piston at the inner end of its slidable cylinder, fluid damping means carried within each slidable cylinder, means in each second piston for governing the flow of said fluid damping means from one side of said piston to the other and return, and means carried by said rotatable housing member for connecting said rotatable driven element and the rotatable housing member together whereby to drive the rotatable driven element on rotation of said rotatable housing member.

2. A centrifugal coupling, comprising, in combination, a driving shaft, a plurality of hollow cylinders radially arranged on said shaft and each axially movable on its own axis, said cylinders constituting centrifugal bodies, liquid damping material in each of said cylinders, a slidable piston in each of said cylinders, a coil spring in each of said cylinders engaging the piston and normally holding the pistons in a position of rest, and a corresponding number of adjustable springs, each of which tends to shift one of said cylinders counter to the centrifugal force, the outer frontal surface of said cylinders designed as a pressure transmitting surface adapted to transmit the turning moment.

3. A centrifugal coupling, comprising, in combination, a driving shaft, a housing secured to and rotatable with said shaft, a plurality of hollow cylinders formed in said housing and having their axes extending radially from the driving shaft, a cylinder axially slidable in each of said hollow cylinders, a sleeve rotatably mounted on said housing, a clutch shoe on each of the slidable cylinders, springs urging said hollow cylinders into their normal positions of rest against centrifugal force to hold the clutch shoes out of engagement with the inner surface of the sleeve, a piston slidably mounted in each of said slidable cylinders, a spring urging each piston into its normal position against centrifugal force, damping fluid in each slidable cylinder, and means in each piston permitting passage of the damping fluid from one side to the other thereof.

4. A centrifugal coupling, comprising, in combination, a driving shaft, a housing secured to and rotatable with said shaft, a plurality of hollow cylinders formed in said housing and having their axes extending radially from the driving shaft, a cylinder axially slidable in each of said hollow cylinders, a sleeve rotatably mounted on said housing, a clutch shoe on each of the slidable cylinders, springs urging said hollow cylinders into their normal positions of rest against centrifugal force to hold the clutch shoes out of engagement with the inner surface of the sleeve, a piston slidably mounted in each said slidable cylinder, a spring in each slidable cylinder urging the piston in the slidable cylinder into its normal position against centrifugal force, damping fluid in each slidable cylinder, means in each piston permitting passage of the damping fluid from one side to the other thereof, and means for restricting the return flow of damping fluid through each piston.

5. A centrifugal coupling, comprising, in combination, a driving shaft, a housing secured to and rotatable with said shaft, a plurality of hollow cylinders formed in said housing and having their axes extending radially from the driving shaft, a cylinder axially slidable in each of said hollow cylinders, a sleeve rotatably mounted on said housing, a clutch shoe on each of the slidable cylinders, springs urging said hollow cylinders into their normal position of rest against centrifugal force to hold the clutch shoe out of engagement with the inner surface of the sleeve, a piston slidably mounted in each of said slidable cylinders, a spring urging each piston into its normal position against centrifugal force, a damping fluid in each slidable cylinder, means in each piston permitting passage of the damping fluid from one side to the other thereof, and means in each piston for permitting free flow of the damping fluid from one side to the other of the piston when said device is under the influence of centrifugal force, and for preventing return through said means upon cessation of the rotative movement whereby control of the damping fluid is obtained.

ELMAR WITTKOP.